US012767294B2

(12) United States Patent
Stumpe et al.

(10) Patent No.: US 12,767,294 B2
(45) Date of Patent: Oct. 20, 2026

(54) ACCUMULATOR MODULE AND SWIMMING AND DIVING AID HAVING SUCH AN ACCUMULATOR MODULE

(71) Applicant: Cayago Tec GmbH, Bad Salzuflen (DE)

(72) Inventors: Marc Stumpe, Bad Salzuflen (DE); Hans-Peter Walpurgis, Bad Salzuflen (DE)

(73) Assignee: Cayago Tec GmbH, Bad Salzuflen (DE)

( * ) Notice: Subject to any disclaimer, the term of this patent is extended or adjusted under 35 U.S.C. 154(b) by 1009 days.

(21) Appl. No.: 17/788,257

(22) PCT Filed: Dec. 22, 2020

(86) PCT No.: PCT/EP2020/087560
§ 371 (c)(1),
(2) Date: Jun. 22, 2022

(87) PCT Pub. No.: WO2021/130194
PCT Pub. Date: Jul. 1, 2021

(65) Prior Publication Data

US 2023/0043153 A1 Feb. 9, 2023

(30) Foreign Application Priority Data

Dec. 27, 2019 (DE) ..................... 10 2019 135 838.8

(51) Int. Cl.
*B60L 50/64* (2019.01)
*B60L 3/00* (2019.01)
(Continued)

(52) U.S. Cl.
CPC ............ *B63C 11/46* (2013.01); *B60L 3/0046* (2013.01); *B60L 50/64* (2019.02); *B63G 8/04* (2013.01);
(Continued)

(58) Field of Classification Search
CPC .......... B60L 50/64; H02H 7/18; H02H 5/083; B63H 2011/081; B63C 11/46
See application file for complete search history.

(56) References Cited

U.S. PATENT DOCUMENTS 9,412,994 B2 * 8/2016 Koebler .............. H01M 50/574
2013/0241498 A1 9/2013 Koebler
(Continued)

FOREIGN PATENT DOCUMENTS

DE 102015100499 A1 7/2016
DE 102015117978 A1 4/2017
(Continued)

OTHER PUBLICATIONS

International search report dated May 10, 2021 in corresponding PCT/EP2020/087560.
(Continued)

*Primary Examiner* — Andrew Polay
(74) *Attorney, Agent, or Firm* — Lucian Wayne Beavers; Patterson Intellectual Property Law, PC

(57) ABSTRACT

The invention relates to an accumulator module (26) comprising a moisture-proof housing (28), in which a plurality of accumulator cells (31) is disposed, the contacts of which are electrically interconnected and which are routed to external contacts (30) of the accumulator module (26) disposed at the outer face of the housing (28). To be able to detect a short circuit between the external contacts (30) of the accumulator module (26) in the simplest and most efficient manner possible, it is proposed that a protection device (35) is disposed inside the housing (28), which protection device comprises a detection device (36), which is designed to detect a short circuit between the external
(Continued)

contacts (30). Furthermore, the invention relates to a swimming and diving aid (10) comprising such an accumulator module (26).

15 Claims, 6 Drawing Sheets

(51) Int. Cl.

| | |
|---|---|
| ***B63C 11/46*** | (2006.01) |
| ***B63G 8/04*** | (2006.01) |
| ***B63H 11/08*** | (2006.01) |
| ***B63H 21/17*** | (2006.01) |
| ***H02H 7/18*** | (2006.01) |

(52) U.S. Cl.
CPC ............. *B63H 11/08* (2013.01); *B63H 21/17* (2013.01); *H02H 7/18* (2013.01); *B63H 2011/081* (2013.01)

(56) References Cited

U.S. PATENT DOCUMENTS

2015/0353175 A1* 12/2015 Walpurgis ............. A63B 35/12
114/315
2018/0241237 A1* 8/2018 Kemmann ............. B60L 53/80
2019/0372182 A1* 12/2019 Takayasu ............... B60L 50/64
2021/0129959 A1 5/2021 Walpurgis

FOREIGN PATENT DOCUMENTS

DE 102017101146 A1 7/2018
DE 102018101213 A1 7/2019
JP 2008171662 A 7/2008

OTHER PUBLICATIONS

Office action dated Oct. 19, 2020 in corresponding German Application Serial No. 10 2019 135 838.8, (with English language translation).
Overcurrent protection device. In: Wikipedia, The Free Encyclopedia. Last edited: Oct. 9, 2018, at 9:38 a.m. https://de.wikipedia.org/w/index.php?title=%C3%9Cberstromschutzeinrichtung&oldid=181627623 [accessed Oct. 20, 2025].
Battery pack. In: Wikipedia, The Free Encyclopedia. Last edited: Feb. 8, 2019, at 10:42 PM. https://de.wikipedia.org/w/index.php?title=Akkupack&oldid=185508158 [accessed on Oct. 20, 2025].

* cited by examiner

ACCUMULATOR MODULE AND SWIMMING AND DIVING AID HAVING SUCH AN ACCUMULATOR MODULE

This invention relates to an accumulator module comprising a moisture-proof housing, in which a plurality of accumulator cells is disposed, the contacts of which are electrically interconnected and routed to external contacts of the accumulator module disposed at the outer face of the housing.

Furthermore, the invention relates to a swimming and diving aid comprising a hull having a flow channel and, on its topside, a support surface for an upper body of a user of the swimming and diving aid. An electric motor-driven drive unit, in particular a propeller, is assigned to the flow channel. Furthermore, the swimming and diving aid is equipped with handles designed for the user to hold onto. Controls for user to control the drive unit are disposed on the handles. Such a swimming and diving aid is known from DE 10 2017 101 146 A1.

Electrically powered mobile devices usually take their energy from rechargeable batteries called accumulators. Owing to the frequently high energy demand, lithium-ion cells are predominantly used for this purpose, as they have a fairly high energy density; in other words, the ratio energy density—price is very good.

In many applications, high performance is required besides high capacity. The accumulator cells therefore have to be able to supply a high current and be interconnected accordingly. The electrical connections of an accumulator cell are disposed freely accessible on the outside of a housing of the accumulator cell, because this is necessary for the connection of the cells to the accumulator module. In the event of a short circuit, very high currents flow between the contacts of the accumulator cells, which currents can often cause overheating (defect) and burning of the cells and ultimately possibly of the entire electrical device the accumulator cells supply electrical energy to. A short circuit can be caused, for instance, by the ingress of moisture, in particular salt water or sea water. This can happen in particular when the accumulator module is used in a watercraft for use in seawater and during the sporting, dynamic operation of the watercraft on and below water, as is the case, for instance, with a swimming and diving aid of the type mentioned at the outset.

Accumulator cells are known from the state of the art in various embodiments. Examples include Li-ion accumulator cells having an essentially cylindrical shape (e.g. type 18650 or VL41M) and accumulator cells having an essentially rectangular shape (e.g. pouch cells). All designs have freely accessible contact poles on the outside in common. When a conductive material (e.g. salt water) contacts or bridges these poles, inevitably a short circuit and sudden massive heating of the accumulator cell, even up to fires, occurs. The accumulator cells can be inserted into cylindrical or rectangular accumulator module housings or into ones having any other shape.

To prevent the terminals of the accumulator cells from short circuiting, it is known to dispose the accumulator cells in a moisture-proof housing of the accumulator module. However, the electrical connections of the accumulator module are still routed as external contacts to the outer face of the module housing. To prevent a short circuit between the external contacts in this setup, the accumulator module is disposed in a watertight container in the hull or elsewhere on the watercraft.

Even with careful design and implementation of the moisture-proof container of the accumulator module, seawater can penetrate the container over a longer period of time and/or owing to the high dynamic driving load of the watercraft. As a result, a short circuit between the external contacts of the module housing can occur, causing the accumulator module to heat up and catch fire.

Certain battery technologies (e.g., lithium iron phosphate batteries, $LiFePO_4$) are safer, but have significantly lower energy density and are therefore usually not a viable alternative. Particularly in the case of a swimming and diving aid and its very demanding driving dynamics for above- and underwater operation, especially powerful accumulators are desired and therefore $LiFePO_4$ batteries do not constitute an alternative.

Based on the described prior art, this invention addresses the problem of designing and further developing an accumulator module of the type mentioned above in such a way that the accumulator module or the electrical device supplied thereby, e.g. the swimming and diving aid of the type mentioned above, can be effectively prevented from overheating and catching fire in a simple manner in the event of a short circuit.

To solve this problem, an accumulator module and a swimming and diving aid are proposed. In particular, it is proposed that a protection device, comprising a detection device designed to detect a short circuit between the external contacts, is disposed inside the housing of the accumulator module of the type mentioned above. This setup has the advantage that the accumulator module according to the invention including the accumulator cells disposed in the housing and the protection device can be handled as a single unit and inserted into a matching mount provided for this purpose in the electrical device. The moisture-proof housing ensures that as little water as possible can penetrate the housing and reach the accumulator cells. The integrated protection device safely and reliably detects the external contacts of the housing being short-circuited, i.e. appropriate countermeasures or warnings can be initiated at an early stage. In the event of a detected short circuit, it would be conceivable, for instance, to issue an acoustic and/or visual warning signal to the user of the electrical device, to switch to emergency operation and/or to switch off the accumulator module at the external contacts of which a short circuit was detected. If the electrical device has several accumulator modules, the remaining modules on which no short circuit was detected can continue to be operated. The arrangement of the protective device in the module housing also has the advantage that the protective device is usually also protected against moisture.

According to an advantageous further development of the invention, it is proposed that the protection device comprises an interruption device, which is designed to interrupt a current flow through the external contacts of the accumulator module upon detection of a short circuit between the external contacts. In this way, overheating of the accumulator module can be prevented quickly and effectively. In addition, the arrangement of the interruption device in the module housing has the advantage that the interruption device is usually protected from moisture and, in turn, cannot be by-passed or impaired in its function by moisture.

According to a preferred embodiment, it is proposed that the protective device comprises one or more fuses. The fuse can be adapted to the current flow usually occurring during the intended operation of the electrical device. At least part of the current flowing through the external contacts flows through the fuse(s). If the maximum current flow (or a dependent variable or a variable representing the current flow) occurring during intended operation is exceeded by a certain value and/or for a certain period of time, the fuse trips and interrupts the current flow through the external contacts of the accumulator module. The fuse thus combines the functions of the detection device and of the protection device of the safety device. The use of one or more fuses is a particularly simple and inexpensive but very reliable way of implementing the invention. By using several different fuses connected in parallel, a gradual reduction of the power delivered by the accumulator module can also be implemented. Instead of a fuse, another type of protection device can also be used, for instance a circuit breaker, a self-resetting fuse or an electronic fuse.

According to an alternative embodiment, it is proposed that the protective device comprises an electric circuit. It is preferably designed as an integrated circuit. To this effect, it is proposed that the electronic circuit has means for monitoring a current flow through the external contacts of the accumulator module and for detecting a short circuit between the external contacts when the monitored current flow exceeds a preset threshold value. The electronic circuit can comprise an op-amp as a detection device for comparing the current value of the current flowing through the external contacts (or a variable dependent on the current flow or representing the current flow) to a preset threshold value and, if necessary, an electrical switching element, e.g. in the form of a transistor, as an interrupt device. As soon as the actual value of the current flowing through the external contacts (or the corresponding variable) exceeds or falls below the threshold value, the op-amp outputs a trigger signal to control the electrical switching element for it to open and interrupt the current flow. It is conceivable that the electrical current flowing through the external contacts does not flow directly through the electrical switching element but, for instance, through a circuit breaker actuated by the electrical switching element. Furthermore, it is conceivable that the electronic circuit is implemented in software terms by means of a processor and a computer program running thereon. Also in this embodiment, it is of particular advantage for electrical circuitry to be protected from moisture by the module housing.

The accumulator cells can be of any shape and can be assembled into accumulator modules of any shape. According to a preferred embodiment, however, it is proposed that the accumulator cells each have a mainly cylindrical shape and the contacts of the accumulator cells are disposed on end faces of the cylindrical accumulator cells. Advantageously, the accumulator cells are held in a bipartite mount, preferably made of plastic, wherein the parts of the mount enclose the accumulator cells at opposite ends. This has the advantage that cavities are formed between the individual accumulator cells, which can be used to cool the accumulator cells during operation of the electrical device, which is provided with the accumulator module for power supply. Preferably, the cavities are filled with air. However, it would also be conceivable for the cavities to be filled with a material having a higher thermal conductivity than air, e.g. a plastic (polyethylene (PE), polyetheretherketone (PEEK), polyamides (nylon) or polyimides (PI)).

Preferably, the accumulator cells are clamped in the bipartite mount and/or the two parts of the mount are braced against each other after the accumulator cells have been disposed in the bipartite mount. In the first case, the accumulator cells can be press fit into matching mounting recesses of the retaining parts and are then held therein by means of frictional engagement. In the second case, the opposite ends of the accumulator cells can be inserted into the retaining parts and the retaining parts can then be braced against each other, for instance by passing at least one threaded rod lengthwise (in parallel to the longitudinal extension of the cylindrical accumulator cells) through the accumulator module and securing it to the outer faces of the retaining parts, for instance by means of a nut. Other tensioning mechanisms for bracing the retaining parts against each other may also be used.

Preferably, the contacts of the accumulator cells are interconnected electrically by means of several contact plates and routed to the external contacts of the accumulator module. The accumulator cells may be connected in series or in parallel, or partially in series and partially in parallel. The goal when connecting the cells is to obtain an accumulator module having a desired voltage applied to the external contacts and a desired current flowing through the external contacts. The voltage and current of the accumulator module is adapted to the electrical requirements of the electrical device that the accumulator module supplies with electrical energy. It is conceivable that the electrical device has more than one accumulator module according to the invention. In that case, too, the various accumulator cells may be connected in series or in parallel, or partially in series and partially in parallel. In the case of an accumulator module for use in a swimming and diving aid according to the invention as the sole accumulator module, the latter may, for instance, have a voltage of 48V, an electrical charge of 42 Ah and a capacity of 2.0 kWh. Depending on the type and electrical properties of the accumulator cells used, they are connected in series and/or in parallel. The external contacts disposed on the outer face of the module housing can be in contact with the accumulator cells or the contact plates by means of a waterproof bushing. However, it would also be conceivable for part of the contact sheets to be routed through a watertight feedthrough to the outer face of the module housing and to form the external contacts.

Advantageously, the contact plates are attached to the parts of the mount. For instance, it would be conceivable for the contact plates to be attached to the parts of the mount by caulking, gluing, welding, soldering, bracing or clamping. In this way, the accumulator cells can be attached to each other by means of the mounting parts and at the same time electrically interconnected in the desired manner by means of the contact plates attached to the mounting parts. The battery cells, attached to one another and interconnected, can be inserted into the module housing as a unit, and the housing can then be sealed to render it watertight. When the unit is inserted into the housing, it is either automatically contacted to the external contacts or parts of the unit's contact plates automatically slide into the positions provided for the external contacts during insertion and form the external contacts.

The accumulator module according to the invention is particularly well suited for use in a watercraft, especially in the form of the swimming and diving aid according to the invention, for operating an electric motor and for driving a drive unit of the watercraft. The drive of the drive unit causes propulsion and/or steering of the watercraft. Operating the highly dynamic operation of the swimming and diving aid on and below water in fresh water and salt water requires a particularly safe and reliable accumulator module to supply power to the electric motor. The accumulator module and its moisture-proof housing are in turn disposed in a container in the hull or any other location of the swimming and diving aid and connected to the electrical system of the watercraft. The container can preferably be closed in a moisture-proof manner, for instance by means of a lid and a seal. For improved heat dissipation, the container and the accumulator module disposed therein may be disposed in the flow channel, adjacent thereto, or elsewhere in the swimming and diving aid in contact with the surrounding water. In addition, the swimming and diving aids according to the invention are generally operated in a highly dynamic manner on and below water in fresh water and salt water. The resulting hydrostatic pressure can cause water to enter the container and result in leakage currents or a short circuit between the external contacts of the accumulator module. They are detected by the protection device in the module housing and suitable counter or protective measures are initiated if necessary.

Further features and advantages of this invention are explained in more detail below on the basis of the Figures. In this context, the features described and/or shown in connection with the various exemplary embodiments can also be combined with each other in any other way than that shown in the figures. In the figures:

FIG. 1 shows a perspective view of a swimming and diving aid 10 according to this invention from behind. In FIG. 2, the swimming and diving aid 10 shown in FIG. 1 is shown in a perspective side view from the front.

Figure 1:
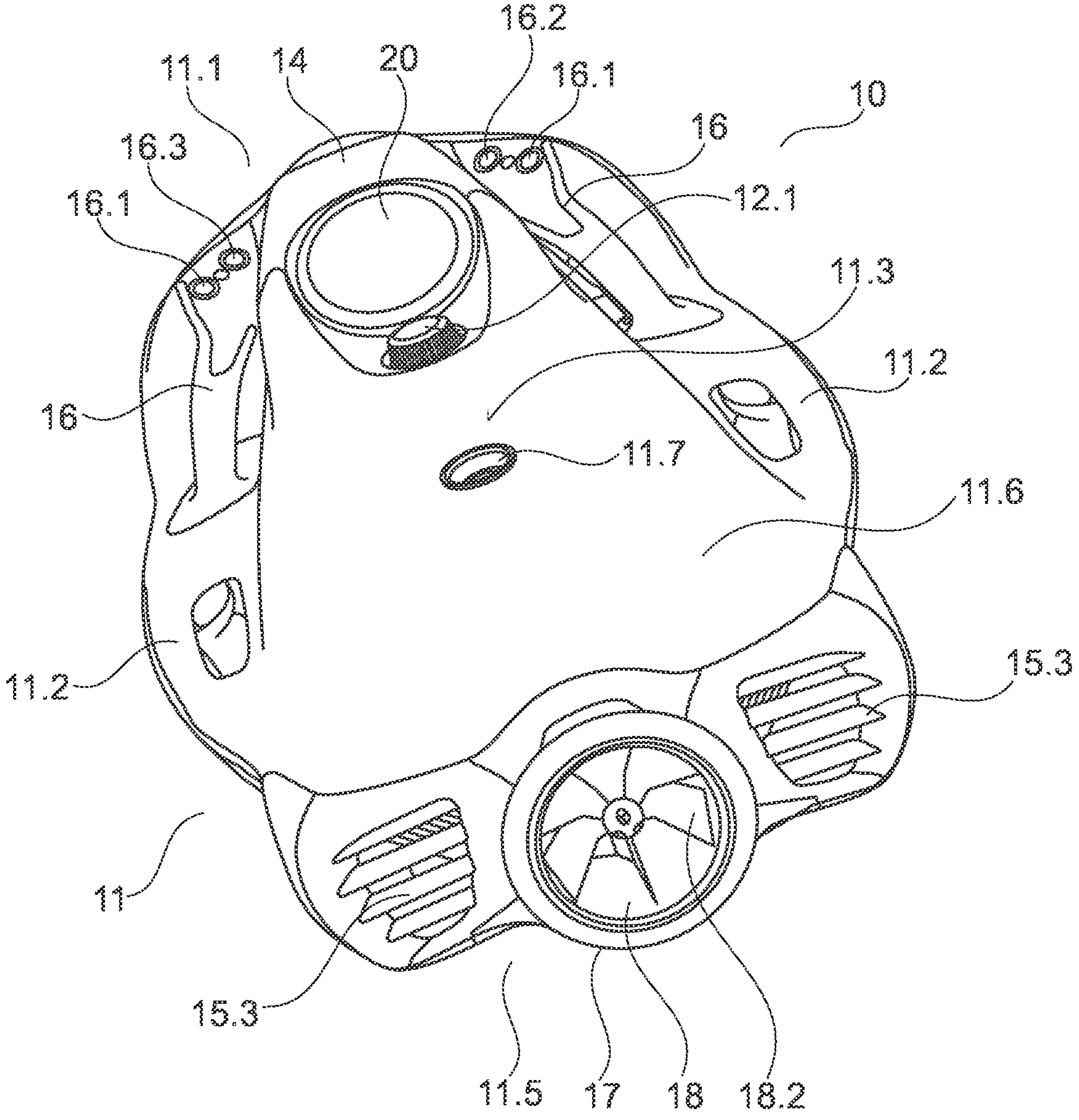
FIG. 1 shows a perspective view from behind of a swimming and diving aid according to the invention.

The swimming and diving aid 10 has a hull 11. The hull 11 is assembled of an upper part 11.6 and a lower part 11.4 shown in FIG. 2. Of course, the hull 11 can also be integrally formed, in which case there is preferably a maintenance door on the topside of the hull 11, which can be closed in a watertight manner. The upper part 11.6 is provided with two handles 16 in the front area of the swimming and diving aid 10, which handles are disposed on both sides of the hull 11 and which handles a user of the swimming and diving aid 10 can hold on to during the intended operation. Controls 16.1 for user control of the flotation and diving aid 10 are attached to the handles 16. In particular, the power of an electric motor of the swimming and diving aid 10 can be varied there. Preferably, a control element for increasing the engine speed is disposed on one of the handles 16 and a control element for reducing the engine speed is disposed on the other handle 16.

A switching element 16.2 is additionally disposed on one of the handles 16 and a changeover element 16.3 is disposed on the other handle 16. During intended operation, the upper body of the user, who is holding on to the handles 16, rests on a support surface 11.3 on the topside of the hull 11, the support surface 11.3 extending approximately from the center of the hull 11 to the rear. The support surface 11.3 is disposed in particular in an area behind a display 20 on the upper part 11.6. In this position, the user can read the display 20 located in his field of vision in a particularly ergonomic manner during the intended operation of the swimming and diving aid 10 and operate the control elements 16.1, the switching element 16.2 and the changeover element 16.3 located within reach. The swimming and diving aid 10 is preferably moved to the left and right or up and down by the user shifting his weight while holding on to the handles 16.

A mount 11.7 for attaching a harness system is attached to the support surface 11.3, which the user can use to strap himself to the swimming and diving aid 10. This enables dynamic and at the same time particularly fatigue-free operation of the swimming and diving aid 10.

A closure 12.1 for a charging socket located behind the closure is disposed in front of the contact surface 11.3. The charging socket can be used to charge accumulators disposed in the hull 11. Preferably, the accumulators comprise a plurality of interconnected accumulator cells 31 (cf. FIGS. 5 and 6) forming an accumulator module 26. The accumulator cells 31 are preferably designed as lithium-ion accumulators. The accumulator cells 31 are disposed in a moisture-proof housing 28 of the accumulator module 26 (see FIGS. 4 and 6).

Carrying handles 11.2 may be disposed at the side of the hull 11, for carrying the swimming and diving aid 10 when it is not on/in the water. A removable cover hood 14 may be attached to the hull 11 in front of the display 20 in the direction of travel and between the two handles 16. Laterally, as shown in FIG. 2, vents 15.1 are provided in the cover hood 14, which vents may be connected to a flooding chamber provided in the hull 11.

Figure 2:
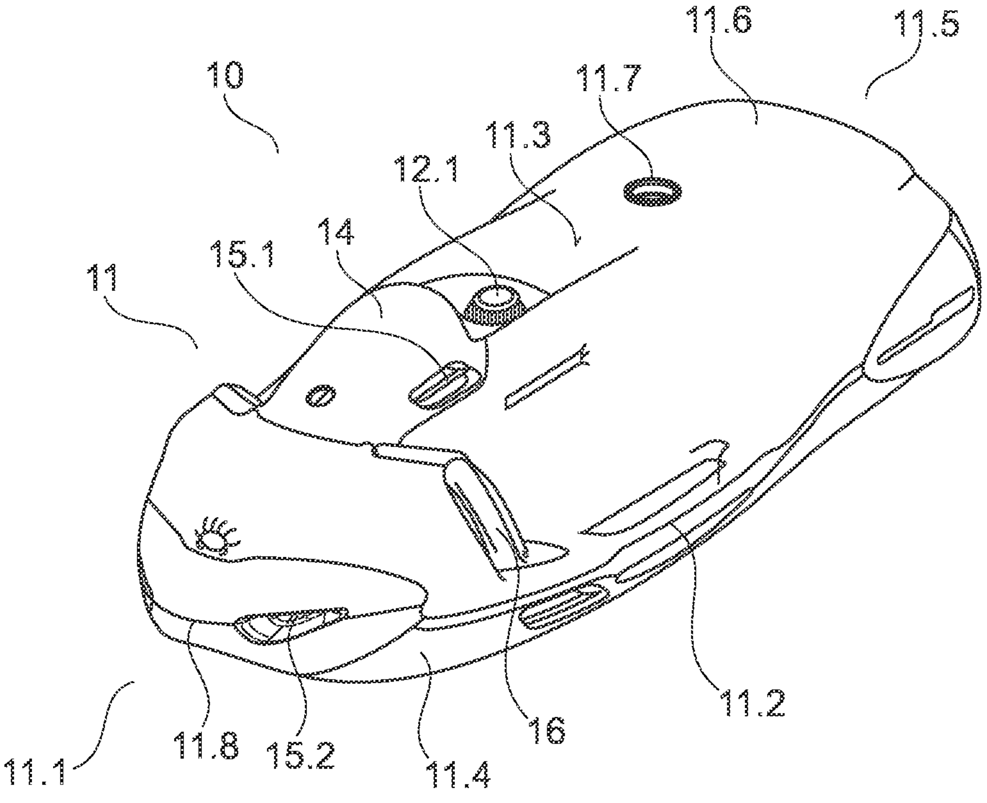
FIG. 2 shows a perspective view of the swimming and diving aid of FIG. 1 from diagonally in front.

As can be seen in FIG. 2, water inlet openings 15.2, through which water can flow into the flooding chamber, can be provided in the area of the bow 11.1 or at any other suitable location on the hull. The flooding chamber can be vented for this purpose through the vent openings 15.1, which are preferably provided in the cover hood 14. The water-filled flooding chamber adjusts the buoyancy of the swimming and diving aid 10 to maintain a predetermined buoyancy force, to facilitate both swimming and diving operations without any great effort.

At the stern 11.5 shown in FIG. 1 or at any other suitable location of the hull of the swimming and diving aid 10, water outlet openings 15.3 may be provided, preferably covered by louvers, which water outlet openings are also connected to the flooding chamber. The flooding chamber, once the swimming and diving aid 10 is placed in the water, is flooded with water entering through the water inlet openings 15.2 and water outlet openings 15.3. As soon as the swimming and diving aid 10 goes into driving mode, a flow is generated in the flooding chamber. In the process, the water enters the flooding chamber through the water inlet openings 15.2, flows through the flooding chamber, and in the process flows around electrical components that may be disposed in the flooding chamber, such as an electric motor for driving a drive unit, in particular a propeller, of the swimming and diving aid 10 or the assigned accumulators. In the process, water absorbs the dissipated power (heat) of the electrical units, transports it away and in that way cools the units. After flowing through the flooding chamber, the water leaves the latter through the water outlet openings 15.3, which can be disposed symmetrically on both sides of a jet outlet 17 of a flow channel 18.

Figure 3:
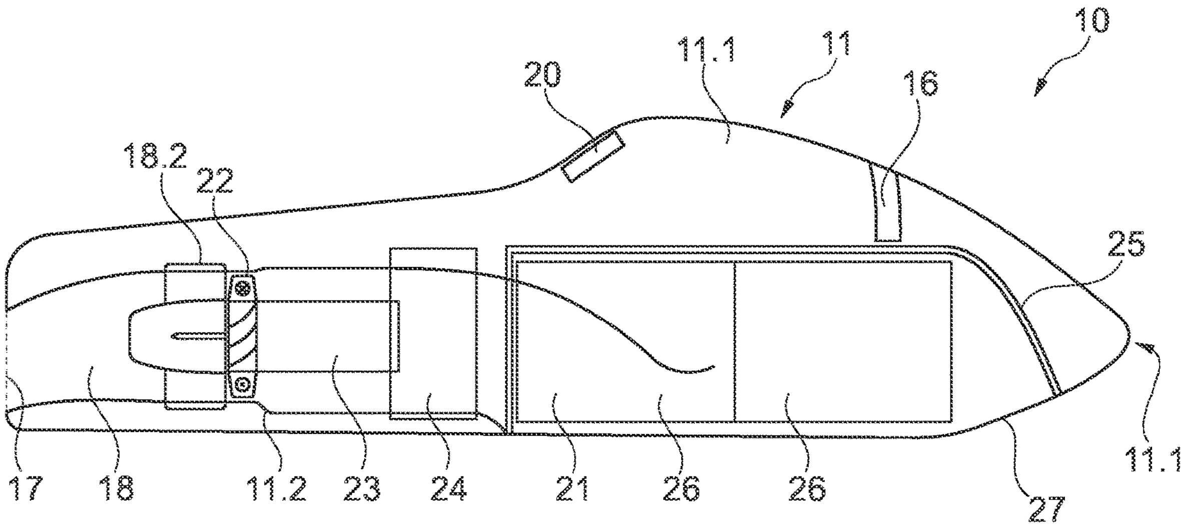
FIG. 3 shows a side view of a swimming and diving aid according to the invention.

The drive unit of the swimming and diving aid 10 are disposed in the flow channel 18, as shown in FIG. 3, where water is sucked in and ejected from the jet outlet 17 at the rear, giving the swimming and diving aid 10 a forward thrust.

A flow stator 18.2 can be disposed in the flow channel 18 on the outlet side in the area of the jet outlet 17, which counteracts a rotation of the water flowing through the flow channel 18, such that the water flows out of the flow channel 18 with as little rotation as possible from the jet outlet 17. In this way, the rotational motion of the water is converted into a linear motion and used to drive the swimming and diving aid 10.

The hull 11 of the swimming and diving aid 10 is preferably made of a plastic or composite material. As a result, the swimming and diving aid 10 has a low weight, i.e., a single person can carry it when it is not in or on the water.

A nose tip 11.8 forming the front area of the bow 11.1 is made of an elastic material, for instance rubber or silicone. This increases the impact resistance of the swimming and diving aid 10 in the area of the bow 11.1.

FIG. 3 shows a side view of the swimming and diving aid 10 according to the invention. The flow channel 18 extends from an inflow opening 21 in the area of the bow 11.1 to the jet outlet 17 in the rear area of the hull 11. The inlet opening 21 extends from a central area of the hull 11 in the direction of the nose 11.1. A drive unit 22, which may have the form of a propeller, and the flow stator 18.2, an electric motor 23 and a motor control unit 24 are disposed in the flow channel 18, which is curved slightly downwards in the area of the inflow opening 21 and the jet outlet 17. The flow stator 18.2 is connected to the hull 11 in a fixed manner. Of course, the electric motor 23 and the motor control unit 24 can also be disposed outside the flow channel 18 at any other location in the hull 11, for instance in the flooding chamber.

The flow channel 18 can then be formed into the hull segment 11 in an integral manner. In this embodiment, the upper part 11.6 and the lower part 11.4 delimit the flow channel 18. The components are interconnected by means of suitable fasteners.

For maintenance of the drive unit 22, the electric motor 23 and the motor control unit 24, the flow channel 18 can be made accessible by removing the lower part 11.4. However, a maintenance door or the like may also be provided below the drive unit 22, the electric motor 23, and the motor control unit 24 to provide access to the components in the flow channel 18.

In the area of the bow 11.1 of the hull 11, a container 25 may be formed in the underside, in which the at least one accumulator module 26 is disposed. In a preferred embodiment of the invention, the at least one accumulator module 26 is housed in the flooding chamber for cooling purposes. Two accumulator modules 26 are provided in the example shown. A maintenance door 27 or the like can be used to close the container 25 in a watertight manner. Despite the waterproof seal, small amounts of water may enter the container 25 due to the highly dynamic operation of the swimming and diving aid on and below water. Particularly in the case of sea or salt water, penetrating moisture can cause a short circuit on external contacts at the outer face of the housing of the accumulator modules 26. As will be described in further detail below, the accumulator modules 26 according to the invention are configured in a particular manner to detect a short circuit at an early stage and to prevent damage to the accumulator modules 26 caused by the short circuit.

By arranging the accumulator modules 26 such that they are at least indirectly exposed to passing water in the flooding chamber or along both their sides (port and starboard) and/or on the keel side, they can be optimally cooled to prevent excessive heating of the accumulator modules 26 during operation.

Figure 4:
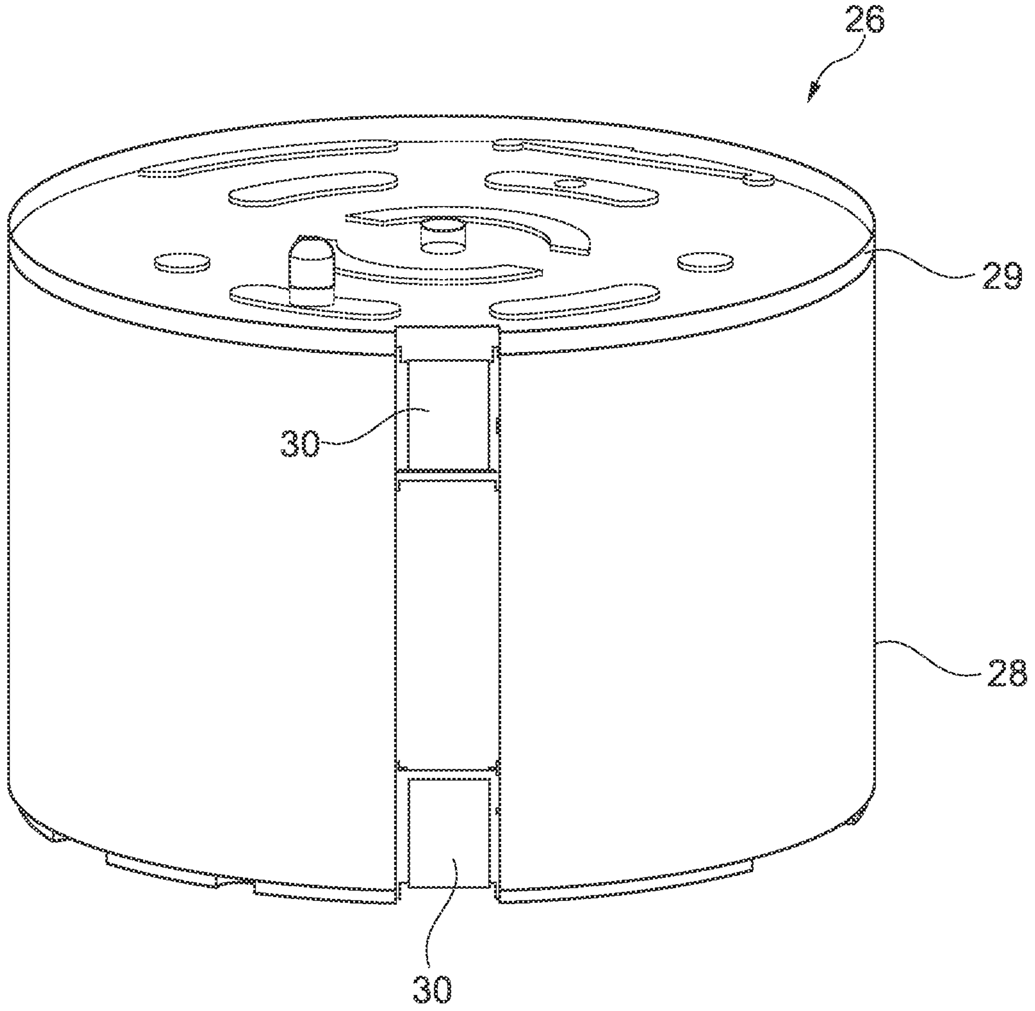
FIG. 4 shows a perspective slanted view from above of an accumulator module according to the invention.

FIG. 4 shows an accumulator module 26 according to the invention, which can be used, for instance, in the swimming and diving aid 10 according to the invention. The module 26 comprises a moisture-proof housing 28, in which a plurality of accumulator cells (see FIG. 5) is disposed. The housing 28 may have any shape; in the example shown, it has a mainly cylindrical shape. The housing 28 includes an opening through which the accumulator cells can be inserted. The opening can be closed by a lid 29 in a moisture-proof manner. It is conceivable that the cover 29 is glued, welded or otherwise non-detachably connected to the rest of the housing 28. Likewise, it is conceivable that the cover 29 is detachably connected to the rest of the housing 28, in which case a sealing element is preferably disposed between the cover 29 and the upper edge of the housing 28 delimiting the opening. External contacts 30 of the accumulator module 26 (a positive terminal and a negative terminal) are disposed on the outer face of the housing 28.

Figure 5:
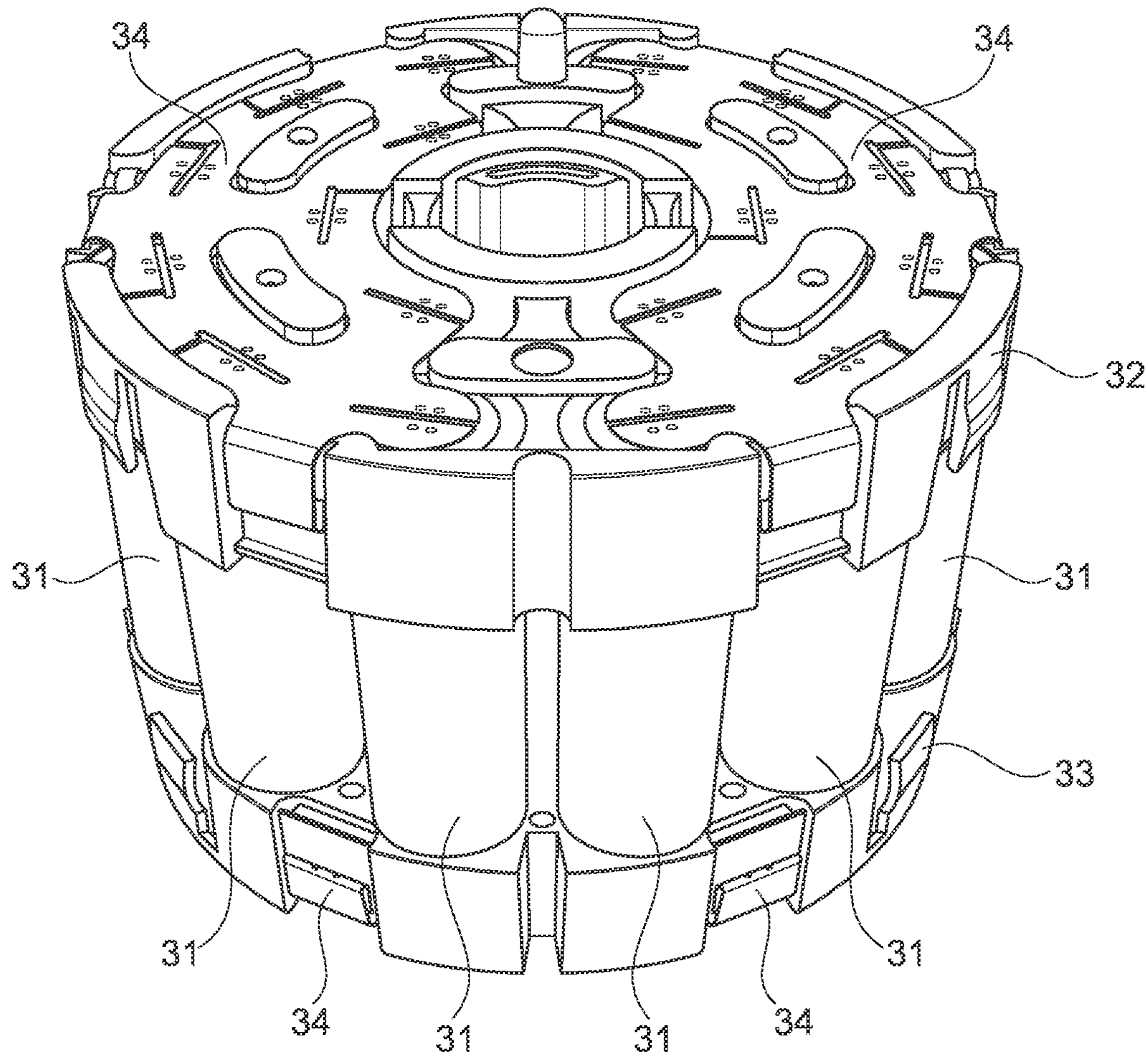
FIG. 5 shows a perspective slanted view from above of several accumulator cells of an accumulator module according to the invention.

FIG. 5 shows several accumulator cells 31 of the accumulator module 26. Preferably, the cells 31 each have a mainly cylindrical shape. The contacts (not shown in FIG. 5, but schematically shown in FIG. 6) of the accumulator cells 31 are disposed on end faces of the cylindrical accumulator cells 31. The contacts of the accumulator cells 31 may be referred to as cell contacts. In the example shown, the accumulator cells 31 are held in a bipartite mount 32, 33, which is preferably made of plastic. Here, the parts 32, 33 of the mount enclose the accumulator cells 31 at opposite ends. The accumulator cells 31 can be clamped in the bipartite mount 32, 33, for instance by means of a press fit. Alternatively or additionally, the two parts 32, 33 of the mount can be braced against each other after arranging the accumulator cells 31 in the bipartite holder 32, 33.

The contacts of the accumulator cells 31 may be electrically interconnected in series or in parallel and routed to the external contacts 30 of the accumulator module 26. The desired values for voltage and current can be achieved at the external contacts 30 by electrically interconnecting the cells 31. Advantageously, the contacts of the accumulator cells 31 are interconnected electrically by means of several contact plates 34 and routed to the external contacts 30 of the accumulator module 26. Preferably, the contact plates 34 are attached to the parts 32, 33 of the mount. The fastening may be detachable or non-detachable. The plates 34 may be attached to the parts of the mount 32, 33 by caulking, gluing, welding, soldering, bracing or clamping.

The accumulator cells 31 including the mount 32, 33 and the contact plates 34 form a separately manageable unit, in which the cells 31 are held and electrically contacted and which can be inserted as a whole through the opening in the housing 28.

Figure 6:
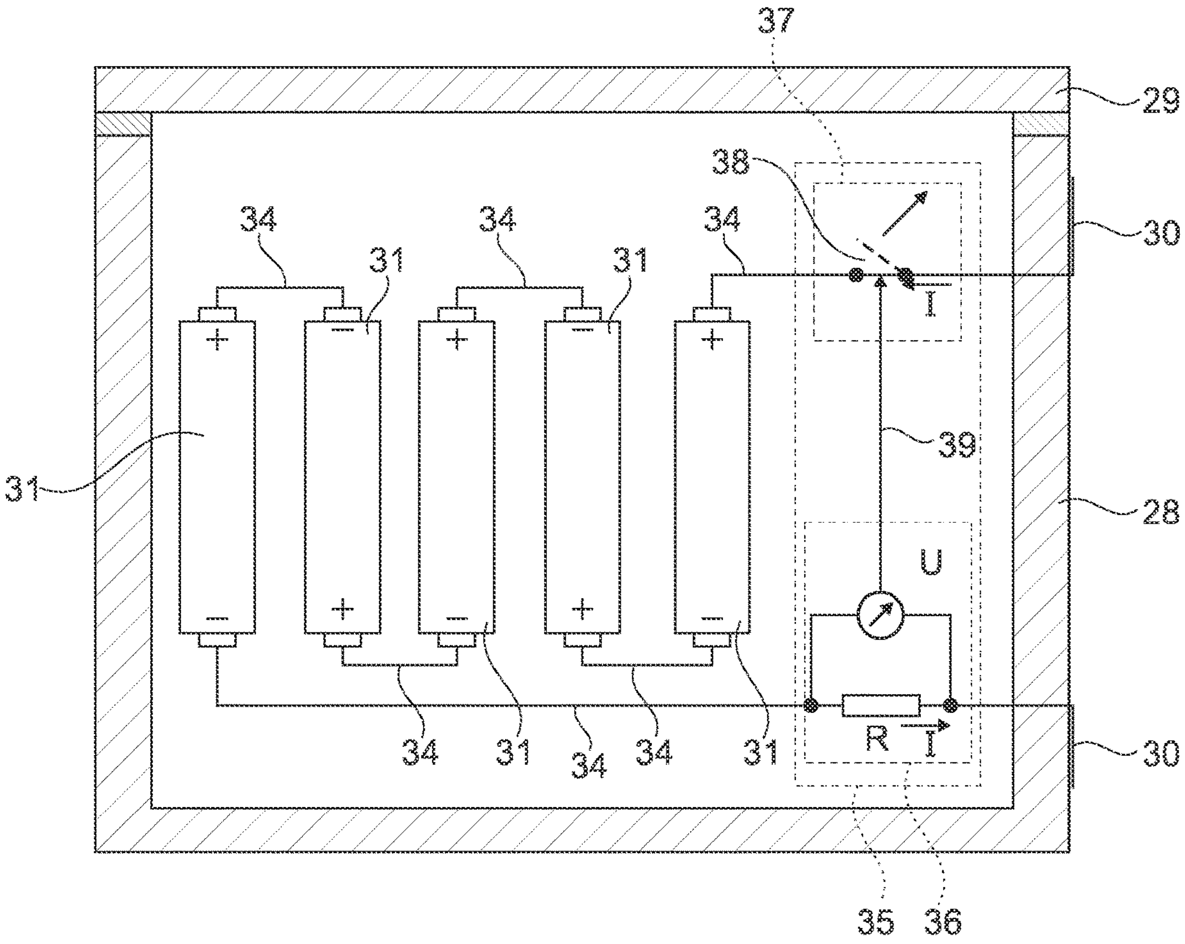
FIG. 6 shows a sectional view of an accumulator module according to the invention.

FIG. 6 shows a section through an accumulator module 26 according to the invention, wherein the bipartite mount 32, 33 is not shown. Other means instead of the mount 32, 33 may be used to hold the accumulator cells 31 in the housing 28. Inside, the accumulator cells 31 connected in series, which are in electrical contact with the external contacts 30, are visible. Furthermore, a protection device 35, comprising a detection device 36 configured to detect a short circuit between the external contacts 30, is disposed inside the housing 28. The detection device 36 may also be referred to as a detection circuit 36. In the event of a short circuit between the external contacts 30, the voltage between the two external contacts 30 or the conductor paths (contact plates 34) leading thereto drops sharply, whereas the strength of the current I flowing across the outer contacts 30 increases sharply. In the example shown, the detection device 36 measures the current through a current measuring resistor (a so-called shunt) R disposed in the current path, at which a voltage drop U dependent on the current I occurs.

The measured voltage U is representative for the current I. If the voltage U exceeds a preset threshold value, a short circuit between the external contacts 30 is assumed.

Preferably, the protection device 35 includes an interruption device 37 configured to interrupt the flow of current I across the external contacts 30 of the accumulator module 26 upon detection of a short circuit between the external contacts 30. The interruption device 37 may also be referred to as an interruption circuit 37. The interruption device 37 comprises, for instance, an electrical switching element 38, for instance a transistor, which, in the event of a detected short circuit, is actuated by a drive signal 39 generated by the detecting device 36. By activating the electrical switching element 38, the current flow I is interrupted (open position of the switching element 38 shown as dashed lines).

The protection device 35 is preferably designed as an electronic circuit, in particular as an integrated circuit (e.g. IC or ASIC). This renders the protection device 35 of particularly small size, and it can be easily disposed in the housing 28 of the accumulator module 26. The protection device 35 can also be formed in any other way. It is important for the latter to have means for monitoring a current flow through the external contacts 30 of the accumulator module 26 and for detecting a short circuit between the external contacts 30 when the monitored current flow exceeds a preset threshold value. How exactly the short circuit is detected in detail is not significant for the invention.

In one particularly simple, inexpensive, and small-scale example, the protection device 35 may include one or more fuses (not shown). The fuse can be adapted to the current flow I usually occurring during the intended operation of the electrical device. At least part of the current I flowing through the external contacts 30 flows through the fuse(s). If the maximum current flow (or a dependent variable or a variable representing the current flow) occurring during intended operation is exceeded by a certain value and/or for a certain period of time, the fuse trips and interrupts the current flow I through the external contacts 30 of the accumulator module 26. The fuse thus combines the functions of the detection device 36 and the interruption device 37 of the safety device 35 in one single component. Instead of a fuse, another type of protection device can also be used, for instance a circuit breaker, a self-resetting fuse or an electronic fuse.

The invention claimed is:

1. A swimming and diving aid, comprising:

a hull including a flow channel;

an electric motor-driven drive unit disposed in the flow channel, the drive unit including a propeller;

the hull including a support surface on a topside of the hull for an upper body of a user of the swimming and diving aid;

handles attached to the hull and configured for the user to hold onto, the handles including operator inputs configured such that the user may control the drive unit; and an accumulator module configured to supply electrical energy to the drive unit, the accumulator module including:

a moisture-proof housing having an outer face;

a plurality of accumulator cells disposed in the housing, each accumulator cell including cell contacts, the cell contacts of the plurality of accumulator cells being electrically interconnected;

external contacts disposed at the outer face of the housing, the external contacts being electrically connected to the cell contacts; and a detection circuit configured to detect a short circuit between the external contacts, the detection circuit including one or more fuses.

2. The swimming and diving aid of claim 1, wherein: the accumulator module further includes an interruption circuit configured to interrupt a flow of current through the external contacts of the accumulator module upon detection by the detection circuit of a short circuit between the external contacts.

3. The swimming and diving aid of claim 2, wherein: the detection circuit includes a shunt resistor configured such that the detection circuit measures a voltage drop across the shunt resistor.

4. The swimming and diving aid of claim 3, wherein: the interruption circuit includes an electrical switch actuatable in response to the measured voltage drop across the shunt resistor.

5. The swimming and diving aid of claim 2, wherein: the interruption circuit includes an electrical switch actuatable by a drive signal from the detection circuit.

6. The swimming and diving aid of claim 5, wherein: the electrical switch is a transistor.

7. The swimming and diving aid of claim 1, wherein: the detection circuit includes an electronic circuit.

8. The swimming and diving aid of claim 7, wherein: the electronic circuit is configured to monitor a flow of current through the external contacts and to detect a short circuit between the external contacts when the flow of current exceeds a threshold value.

9. The swimming and diving aid of claim 1, wherein: the accumulator cells each have a substantially cylindrical shape, and the cell contacts of each of the accumulator cells are disposed on end faces of each accumulator cell.

10. The swimming and diving aid of claim 9, further comprising:

a bipartite mount including first and second mount parts, wherein the first and second mount parts enclose opposite ends of the accumulator cells.

11. The swimming and diving aid of claim 10, wherein: the first and second mount parts are made of a plastic material.

12. The swimming and diving aid of claim 10, wherein: the accumulator cells are clamped in the bipartite mount.

13. The swimming and diving aid of claim 10, wherein: the first and second mount parts are braced against each other with the accumulator cells disposed in the bipartite mount.

14. The swimming and diving aid of claim 10, further comprising:

a plurality of contact plates electrically interconnecting the cell contacts of the accumulator cells, the contact plates being electrically connected to the external contacts.

15. The swimming and diving aid of claim 14, wherein: each of the contact plates is secured to at least one of the first and second mount parts.

* * * * *